United States Patent
Brand et al.

(10) Patent No.: US 12,197,183 B2
(45) Date of Patent: Jan. 14, 2025

(54) METHOD AND DEVICE FOR COMPENSATING FOR A THERMALLY INDUCED CHANGE IN POSITION ON A NUMERICALLY CONTROLLED MACHINE TOOL

(71) Applicant: DECKEL MAHO Seebach GmbH, Seebach (DE)

(72) Inventors: Matthias Brand, Seebach (DE); Ines Schmidt, Waltershausen (DE); Isabella Glöde, Wutha-Farnroda (DE); Janine Glänzel, Chemnitz (DE); Christian Naumann, Claußnitz (DE); Alexander Geist, Chemnitz (DE)

(73) Assignee: DECKEL MAHO Seebach GmbH, Seebach (DE)

( * ) Notice: Subject to any disclaimer, the term of this patent is extended or adjusted under 35 U.S.C. 154(b) by 447 days.

(21) Appl. No.: 17/436,594

(22) PCT Filed: Apr. 5, 2019

(86) PCT No.: PCT/EP2019/058728
§ 371 (c)(1),
(2) Date: Sep. 4, 2021

(87) PCT Pub. No.: WO2020/200485
PCT Pub. Date: Oct. 8, 2020

(65) Prior Publication Data
US 2022/0171363 A1    Jun. 2, 2022

(51) Int. Cl.
*G05B 19/404*    (2006.01)
*G06N 3/045*    (2023.01)
*H04L 67/125*    (2022.01)

(52) U.S. Cl.
CPC ........... *G05B 19/404* (2013.01); *G06N 3/045* (2023.01); *H04L 67/125* (2013.01)

(58) Field of Classification Search
CPC ........ G05B 19/404; G05B 2219/39192; G05B 2219/49204; G05B 2219/49207;
(Continued)

(56) References Cited

U.S. PATENT DOCUMENTS

2018/0196405 A1*   7/2018   Maekawa ............ G05B 19/404

FOREIGN PATENT DOCUMENTS

| AT | 7710 U2 | 7/2005 |
| CN | 105807714 A | 7/2016 |

(Continued)

OTHER PUBLICATIONS

English translation of JP-3897501-B2 (Year: 2007).*
(Continued)

*Primary Examiner* — Shon G Foley
(74) *Attorney, Agent, or Firm* — Henricks Slavin LLP

(57) ABSTRACT

The present invention relates to methods and devices for compensating for a thermally induced change in position on a numerically controlled machine tool, wherein: a characteristic map describing the thermoelastic behaviour of the machine tool is provided to a control system of the machine tool; one or more temperature values are determined by means of one or more temperature sensors on the machine tool; one or more compensation parameters are determined on the control system of the machine tool on the basis of the one or more temperature values determined and of the characteristic map provided; and wherein a temperature-dependent change in position on the machine tool is performed according to the one or more compensation values determined. According to the invention, the characteristic map provided is adjusted or updated by means of a neural network running on a computer.

23 Claims, 3 Drawing Sheets

(58) Field of Classification Search
CPC ........... G05B 2219/49219; G05B 2219/49206; G06N 3/045; H04L 67/125
See application file for complete search history.

(56) References Cited

FOREIGN PATENT DOCUMENTS

| | | | |
|---|---|---|---|
| DE | 19706750 A1 | 8/1998 | |
| DE | 102010003303 A1 | 9/2011 | |
| DE | 102014202878 A1 | 8/2015 | |
| DE | 102015115838 A1 | 3/2017 | |
| EP | 0735443 A2 | 10/1996 | |
| EP | 3316056 A1 | 5/2018 | |
| JP | 11-114776 A | 4/1999 | |
| JP | 11-267949 A | 10/1999 | |
| JP | 2003-094291 A | 4/2003 | |
| JP | 3897501 B2 * | 3/2007 | |
| JP | 2017-087405 A | 5/2017 | |
| JP | 2017-131937 A | 8/2017 | |
| JP | 2018-111145 A | 7/2018 | |
| JP | 2018-153901 A | 10/2018 | |
| WO | WO-2019077557 A1 * | 4/2019 | ........... G01B 11/161 |

OTHER PUBLICATIONS

English language translation of Office Action dated Apr. 18, 2023 for JP App. Ser. No. 2021-557467.
Office Action dated Mar. 13, 2023 for EPO App. Ser. No. 19719172.9, with English language translation.
Office Action dated Nov. 30, 2023 for CN App. Ser. No. 201980095160.X, with English language translation.
Office Action dated May 18, 2023 for CN App. Ser. No. 201980095160.X, with English language translation.
International Search Report dated Jan. 7, 2020 for PCT App. Ser. No. PCT/EP2019/058728.
Christian Naumann et al., *Characteristic Diagram Based Correction Algorithms for the Thermo-Elastic Deformation of Machine Tools*, 48th CIRP Conference on Manufacturing Systems—CIRP CMS 2015, Jan. 1, 2016, pp. 801-805.
Steffen Ihlenfeldt et al., *On the Selection and Assessment of Input Variables for the Characteristic Diagram Based Correction of Thermo-Elastic Deformations in Machine Tools*, Journal of Machine Engineering, vol. 18, No. 4, Nov. 30, 2018, pp. 25-38.
Steffen Ihlenfeldt et al., *Experimental comparison of map-based and structural model-based correction*, Thermo-Energetic Design of Machine Tools: Accompanying Conference vol.—4th Colloquium, Jan. 1, 2016.
English language translation of Office Action dated Oct. 10, 2023 for Japanese App. Ser. No. 2021-557467.
Office Action dated Jun. 14, 2024 for EP App. Ser. No. 19719172.9, with English language translation.
H. Holzmann, "Neuro-Fuzzy Modeling of Automotive SI-Engine Characteristics," International Federation of Automotive Control, 1998.
O. Nelles et al., "Tool zur Optimierung van Rasterkennfeldern", Automatisierungstechnische Praxis—Atp, Oldenbourg Industrieverlag, Munchen, DE, Jan. 2000.
M. Schmitt, Untersuchungen zur Realisierung mehrdimensionaler lernfahiger Kennfelder in Groβserien-Steuergeraten, Fortschritt-Berichte vol., Reihe 12, Verkehrstechnik, Fahrzeugtechnik, No. 246, Jan. 1995.
J.E. Setzer et al., "Interpolierendes Counterpropagation—Netz zur adaptiven Kennfeld-Nachbildung / Interpolating Counterpropagation Network for Adaptive Modelling of Characteristics," IT—Information Technology, Oldenbourg Wissenschaftsverlag, Munchen, DE, vol. 40, No. 1, Jan. 1998.
S. Topfer et al., "Polynommodelle, Kennfelder und neuronale Netze", Modellgestutzte Steuerung, Regelung Uno Diagnose Von Verbrennungsmotoren, Springer Berlin Heidelberg, pp. 103-119, Jan. 2003.

* cited by examiner

METHOD AND DEVICE FOR COMPENSATING FOR A THERMALLY INDUCED CHANGE IN POSITION ON A NUMERICALLY CONTROLLED MACHINE TOOL

The present invention relates to methods and devices for compensating for thermally induced changes in position on numerically controlled machine tools, in particular to compensation or correction of thermally induced changes in position on numerically controlled machine tools based on characteristic maps.

BACKGROUND OF THE INVENTION

In the prior art, it is known that thermally induced positional errors on machine tools have a major influence on the machining accuracy when machining workpieces on the machine tool. In principle, especially when machining the workpiece, it is therefore desirable to reduce temperature-related changes in position on machine tools or to reduce their influence on the machining accuracy, e.g. by means of active temperature control and/or compensation in the machine control.

Here, one option is the active temperature control or cooling of the machine tool or the machine tool environment in order to reduce temperature influences on the machine tool; cf., e.g., DE 10 2014 202 878 A1.

Another option is the compensation in the machine control, such as by temperature-dependent correction of position target values of the machine axes at the machine control. In the prior art, this was made possible, for example, by measuring the temperature at temperature sensors on the machine tool, wherein the measured temperatures are used to calculate correction parameters by means of calculation formulas by means of which the target axis positions are corrected or adapted in real time at the machine control; cf., e.g., DE 10 2010 003 303 A1.

In addition, it was proposed in DE 10 2015 115 838 A1 to perform temperature compensation on a processing machine with an evaluation unit having a neural network.

A more novel method of temperature-dependent correction of position target values of machine axes at the machine control of a machine tool is the so-called map-based correction or compensation of changes in position on the machine tool; see, e.g., the article "Kennfeldbasierte Korrektur thermischer Positionierfehler an Werkzeugmaschinen" by C. Naumann, Fraunhofer Institute for Machine Tools and Forming Technology -IWU-, Chemnitz; Verbundinitiative Maschinenbau Sachsen-VEMAS-, Chemnitz: Digitalisierung in der Produktion. 3rd Saxon Day of Automation 2017: Mar. 9, 2017.

The above article describes a correction of thermal positioning errors on machine tools based on characteristic maps. The "Abstract" of the article describes: "Thermally caused positioning errors on machine tools may have a major influence on the machining accuracy and thus on the product quality and the profitability of machine tools. The thermal error may account for up to 75% of the total error of the machine. The approaches to reducing these errors range from constructive measures to the use of materials with a low expansion coefficient to model-based correction of thermal errors. Measures used in the industry to reduce the thermo-elastic error are, for example, the thermo-symmetrical design of the machine tool or bringing about a thermally stable state of the machine. For this purpose, the machine is usually cooled in the area of the heat sources or it is warmed up until it is thermally stationary (has reached the "operating temperature"). Another measure is the air conditioning of the environment in order to create constant conditions. The approaches described increase the energy requirement significantly, resulting in a reduction in profitability. As a model-based approach without additional energy demand, the correlative correction is used in the industrial sector. The correlative models mediate between selected temperature measurement points in the machine structure and the displacement at the point of action (tool center point TCP). The map-based correction represents such a correlative approach. With the help of characteristic maps, temperatures on the surface of the machine tool and the current axis configuration are mapped directly to the TCP displacement. The characteristic maps can be taught with data from measurements or thermo-elastic simulations and may then be used online in the integrated into the control during processing. After an overview of thermo-elastic correction and compensation strategies, the article presents the map-based correction. The procedure and the advantages and disadvantages of the method are discussed and finally the functionality of the method is proven experimentally on a demonstrator."

Starting from the basic need for simple, efficient, accurate and/or user-friendly temperature compensation on machine tools and starting from the advantages of map-based or model-based temperature compensation on machine tools according to the prior art described above, it is an object of the present invention to provide improved temperature compensation on machine tools.

SUMMARY OF THE INVENTION

To achieve the object described above, methods and devices for compensating for thermally induced changes in position in numerically controlled machine tools are proposed according to the independent claims. Dependent claims relate to preferred or particularly expedient exemplary embodiments.

According to an exemplary aspect, a method for compensating for a thermally induced change in position on a numerically controlled machine tool is proposed, comprising: providing a characteristic map describing the temperature behavior of the machine tool on a control device of the machine tool, determining one or more temperature values by means of one or more temperature sensors on the machine tool, determining one or more compensation parameters on the control device of the machine tool based on the determined one or more temperature values and the characteristic map provided, and compensating for a temperature-dependent change in position on the machine tool according to the one or more compensation values determined.

According to the invention, a method for compensating for a thermally induced change in position on a numerically controlled machine tool, in particular a map-based method, is characterized in that a characteristic map (or characteristic curve map) provided is adapted by means of a computer-implemented neural network, the temperature compensation in particular being carried out by means of the characteristic map and not directly via the neural network.

In other words, it is particularly preferably proposed according to the invention that the temperature compensation at the machine control is carried out based on a characteristic map (i.e. a map-based correction of thermal positioning errors on machine tools), the map being adapted at least once or several times by means of a neural network.

This has the synergistic advantage that the temperature compensation can be carried out efficiently and user-friendly as well as extremely quickly and accurately in real time at the machine tool control on the basis of the characteristic map provided, wherein a characteristic map created, e.g., on the basis of an FE simulation can be optimized, depending on requirements, by means of training a neural network or by means of an already trained neural network.

According to the invention, a method for adapting a characteristic map describing a temperature behavior of a numerically controlled machine tool may be proposed as an example for use in compensating for a thermally induced change in position on the machine tool, said method comprising: adapting the provided characteristic map by means of a computer-implemented neural network.

Further exemplary aspects or exemplary embodiments and preferred embodiments of the present invention are discussed below.

In preferred exemplary embodiments, input data for the neural network can be determined in real time during operation of the machine tool, in particular during a work process of the machine tool.

In preferred exemplary embodiments, input data for the neural network may include sensor data from sensors of the machine tool and/or input data calculated from sensor data of sensors of the machine tool.

In preferred exemplary embodiments, output data of the neural network may adapt or update the characteristic map. In further preferred exemplary embodiments, output data of the neural network may specify an adapted or updated characteristic map.

In preferred exemplary embodiments, adapting the characteristic map may comprise: reading at least part of the characteristic map currently provided at the control device into the neural network; reading input data, in particular including sensor data from sensors of the machine tool, into the neural network; and/or determining a network structure of at least part of an adapted or updated characteristic map on the neural network.

In preferred exemplary embodiments, the characteristics map provided at the control device may be adapted or updated based in particular on the determined network structure.

In preferred exemplary embodiments, adapting the provided characteristic map can be carried out repeatedly by means of the computer-implemented neural network, particularly preferably at regular intervals.

In preferred exemplary embodiments, the neural network may control the characteristics map provided at the control device of the machine tool.

In preferred exemplary embodiments, sensor values from one or more temperature sensors of the machine tool may be transmitted to the neural network as input data of the neural network for adapting the provided characteristic map.

In preferred exemplary embodiments, sensor values from one or more position sensors of the machine tool may be transmitted to the neural network as input data of the neural network for adapting the provided characteristic map.

In preferred exemplary embodiments, the one or more position sensors of the machine tool may output sensed actual values of linear and/or rotary axes of the machine tool.

In preferred exemplary embodiments, target values of linear and/or rotary axes of the machine tool may be transmitted from the control device to the neural network as input data of the neural network for adapting the provided characteristic map.

In preferred exemplary embodiments, position measurement values of a position measurement method carried out on the machine tool may be transmitted to the neural network as input data of the neural network for adapting the provided characteristic map.

In preferred exemplary embodiments, the position measurement method may be carried out on the machine tool by means of one or more measuring probes. Furthermore, additionally or alternatively, the position measuring method may be carried out on the machine tool by means of one or more electromagnetic measuring devices and/or by means of one or more optical measuring devices, in particular by means of a laser measuring device and/or a camera device.

In preferred exemplary embodiments, the characteristic map describing the temperature behavior of the machine tool may be provided based on one or more FE models and/or FE simulations of the machine tool.

In preferred exemplary embodiments, the neural network may be integrated into the control device of the machine tool.

In preferred exemplary embodiments, the neural network may be integrated into a control computer connected to the control device of the machine tool.

In preferred exemplary embodiments, the neural network may be integrated into a central server connected to the control device of the machine tool.

In preferred exemplary embodiments, the central server may be connected to a plurality of control devices of machine tools.

In preferred exemplary embodiments, the central server may include a plurality of neural networks. Each neural network may preferably be associated with one of the machine tools and/or the plurality of neural networks may communicate with one another.

In preferred exemplary embodiments, the method may further comprise: determining a displacement map on the basis of characteristic map entries of the characteristic map(s).

Further aspects and their advantages as well as advantages and more specific implementation options of the aspects and features described above are described with the following descriptions and explanations of the attached figures, which are in no way restrictive.

DETAILED DESCRIPTION OF THE FIGURES AND PREFERRED EMBODIMENTS

Figure 1:
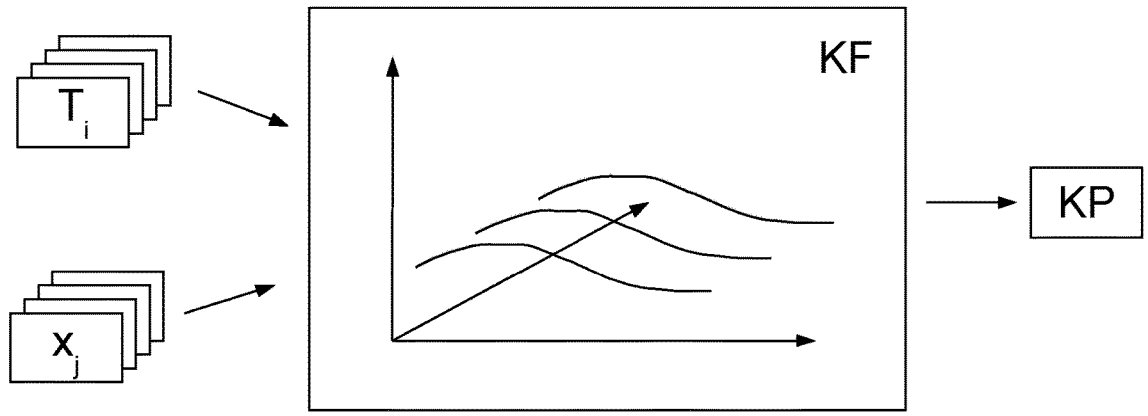
FIG. 1 shows a schematic exemplary diagram of a characteristic map KF for temperature compensation on a machine tool according to an exemplary embodiment of the present invention.

In the following, examples or exemplary embodiments of the present invention are described in detail with reference to the accompanying figures. Identical or similar elements in the figures may be denoted by the same reference symbols, but sometimes also with different reference symbols.

It is to be noted that the present invention is in no way limited or restricted to the exemplary embodiments described below and their implementation features, but rather also includes modifications of the exemplary embodiments, in particular those that are included within the scope of protection of the independent claims via modifications of the features of the examples described or via combinations of individual ones or a plurality of the features of the examples described.

Thermo-elastic effects on machine tools are currently one of the main causes of positioning errors on the machine tool. In addition to the heat input resulting from friction and machining processes, the heat exchange with the environment is not to be neglected. For determining these heat flows and the resulting temperature and deformation maps, complex coupled simulations of fluid and structural mechanics may be necessary. In particular, coupling the two simulations makes transient simulation calculations with moving components difficult since the ambient conditions and thus the heat transfer coefficients are constantly changing A widespread measure in the industry for reducing thermally caused position errors on machine tools is to bring about a thermally stable state of the machine. For this purpose, the machine may usually be cooled or warmed up in the area of the heat sources until it is thermally stable (i.e., has reached the "operating temperature"). Another possible measure is the air conditioning of the environment in order to create constant conditions. The approaches described increase the energy demand significantly, thereby resulting in a reduction in profitability.

Model-based or map-based correction approaches, on the other hand, do not require any additional energy input. Correlative correction is used as a model-based approach in the industrial sector. The map-based models usually mediate between selected temperature measuring points in the machine structure and the displacement at the point of action, e.g. at the tool position (often also called tool center point or TCP).

Map-based correction methods have recently been proposed; see for example the article "*Kennfeldbasierte Korrektur thermischer Positionierfehler an Werkzeugmaschinen*" by C. Naumann, Fraunhofer Institute for Machine Tools and Forming Technology -IWU-, Chemnitz; Verbundinitiative Maschinenbau Sachsen -VEMAS-, Chemnitz: Digitalisierung in der Produktion. 3rd Saxon Day of Automation 2017: Mar. 9, 2017.

In the case of correction methods based on characteristic maps, the temperature compensation is based on at least one characteristic map indicating the temperature behavior of the machine.

A characteristic map may be viewed as a data structure, in particular a regression model, the map indicating or representing a mapping of one or more input variables to one or more output variables. In the case of a mapping from an input variable to an output variable, one may also speak of a characteristic curve.

A characteristic curve is a graphical representation of two interdependent physical quantities that are characteristic of a component, an assembly or a device, for example. The characteristic curve may be displayed as a curve in a two-dimensional coordinate system.

A characteristic curve map or, for short, a characteristic map may represent a plurality of characteristic maps as a function of further input variables, for example in the form of a plurality of characteristic maps or in a three-dimensional coordinate system.

An example of a characteristic curve is the dependence of the electrical current flowing through a diode on the electrical voltage. If the temperature of the diode is further added as a parameter, it becomes a characteristic curve map that consists of a plurality of current-voltage characteristic curves associated with certain temperatures. In control engineering, the characteristic curve describes the static behavior of a system. In practice, characteristic curves are used, inter alia, to define the operating point, to determine a linear approximation at a certain point of the characteristic curve. It may also be used to determine the power loss of a component or to correct the signal output by a sensor.

For the map-based correction or temperature compensation, characteristic maps may be understood as continuous mappings of a set of input variables to a one-dimensional displacement or a one-dimensional compensation parameter. The most important input variables are usually temperatures on and in the machine structure (e.g. recorded or measured by one or more temperature sensors arranged at sensor positions in the machine structure, e.g. on the machine bed, on movable components of the machine tool, on rotatable or pivotable components of the machine tool, etc.) and optionally position data of the machine axes.

Since a 3 or 6-dimensional correction vector for the change in position (e.g. the temperature-dependent change in position of the TCP) may be looked for in the displacement correction in some exemplary embodiments, a distinct map may be created for each of these correction directions or multi-dimensional maps with a plurality of output variables may be provided.

In further exemplary embodiments, it is possible that, instead of the change in position itself, one or more substitute variables are used as output variables and these are then converted to displacement, if necessary, using a downstream model.

Exemplary embodiments relate to a new application of characteristic maps in conjunction with neural networks in the industry.

For the time being, the machine or machine tool may be represented with the aid of an FE mesh in exemplary embodiments.

In addition to the previously used sensory data or sensor values (e.g., temperature values), data or parameters from the control may also be used for FE analyses in further exemplary embodiments.

Such control data may, for example, be data from the control (e.g., drive control: current control, speed control, position control), monitoring, diagnosis and/or motor, mechanics and/or position detection (e.g. motor currents or motor power of drives of the machine tool).

According to some exemplary embodiments, a complete analysis of the machine in a data processing method or a computer-based simulation starting from the analysis of one or more FE models of the machine or machine tool may generate or calculate one or more characteristic maps that preferably describe a temperature behavior of the machine or machine tool.

In further exemplary embodiments—in addition or as an alternative to the calculation of one or more characteristic maps based on an FEM-based simulation—characteristic maps may also be calculated, determined and/or adapted based on a computer simulation of a machine tool (so-called virtual machine tool or so-called digital twin). Additionally or alternatively, characteristic maps may also be determined and/or adapted based on an experimental determination on a machine tool in test operation.

Here, a characteristic map is an example of an n-dimensional mapping which may be used as a regression model and/or in conjunction with interpolation or extrapolation methods.

In some exemplary embodiments, a characteristic may be in the form of a table or matrix and may specify output data (e.g., one or more output variables) for possible input data (e.g., one or more input variables) or may map one or more input variable values to one or more output variable values.

In addition to input data indicating temperature information, which may, e.g., indicate one or more temperature values from temperature sensors on the machine tool, further input data or input variables may also be used. The input data or input variables may also include measured values from air humidity sensors and/or air pressure sensors on the machine tool and/or adjacent to the machine tool.

In addition, the input data or input variables may also include position sensor values (e.g., from position measuring instruments on movable components of the machine tool such as linear, rotary and/or pivot axes) and/or parameters taken from the machine control.

Parameters taken from the machine control or determined or evaluated by the machine control may include, for example, target position values for axes of the machine tool, determined actual position values for axes of machine tools, speeds (e.g., spindle speeds), motor currents, motor power, etc.

In addition, other sensor values may be used as input variables, such as pressure measurement values (e.g., pressure values in hydraulic and/or pneumatic systems of the machine tool, pressure values in cooling circuit systems of the machine tool, etc.), oscillation or vibration measurement values (e.g., from vibration or oscillation sensors), force measurement values (e.g., from force sensors, strain gauge sensors, etc.), torque measurement values (e.g., from torque sensors or based on calculations on the basis of force measurement values), active power values, acceleration measurement values (e.g., from acceleration sensors), structure-borne sound values (e.g. from structure-borne sound sensors), etc.

In some exemplary embodiments, correction terms or one or more correction parameters for the in-control compensation of the temperature displacement may be transferred to the machine control repeatedly or even periodically in temporally discrete sections on the basis of the input variables entered, e.g. by evaluating the sensors and/or in-control data, wherein the machine control may then use the transferred correction terms or one or more correction parameters to perform the temperature compensation, e.g. by adapting the target positions of one or more movable components of the machine tool (e.g. the linear, rotary and/or pivot axes of the machine tool) on the basis of the transferred correction terms or one or more correction parameters.

According to exemplary embodiments, a neural network structure which can update the characteristic map(s) using new data is preferably also implemented.

New training or input data for the neural network may preferably be determined from the real process or during operation on the machine tool (e.g., during an experimental test operation and/or in the real machining process on the machine tool), and additionally or alternatively new training or input data for the neural network may also be determined from a computer-implemented simulation of a machine tool, for example on a virtual machine tool and/or on the basis of a digital twin of the machine tool.

In combination with the existing data from an FE analysis, a computer simulation of a machine tool (virtual machine tool or digital twin) and/or experimental operation of a machine tool, new data which update or adapt or optimize the characteristic map(s) may be generated using a neural network.

In exemplary embodiments, it is particularly preferred that the neural network does not directly influence the actual temperature compensation methods on the machine tool, since the actual temperature compensation method on the machine tool are preferably carried out at the machine control on the basis of one or more characteristic maps, with the characteristic map(s) may be adapted or optimized once or several times or even repeatedly by means of the neural network.

The neural network preferably has no direct influence on the map-based correction but controls or influences the characteristic map(s) and thus only has an indirect influence on the temperature compensation. The map-based correction is particularly preferably carried out on the machine tool on the basis of one or more characteristic maps, the characteristic map(s) being adapted or optimized by the neural network.

In some exemplary embodiments, input data for the neural network for updating may be recorded at the installation site of the machine tool, and automated updating of the characteristic map(s) is possible.

One advantage is the resistance to fluctuating influences. In addition, the invention allows for a significantly improved adaptation of the machines or machine operation to new environmental conditions, e.g. at new installation sites. In addition, there is the advantage that displacement errors can be further reduced and higher manufacturing accuracy is made possible.

The basis for some exemplary embodiments is providing one or more characteristic maps describing a temperature behavior of a machine tool. This may include, for example: selecting the input data or input variables (e.g., temperature, axis positions, etc.), defining limit values of the input variables (e.g., of temperature, positions; maximum values and/or minimum values), discretizing the input variables (e.g., definition of a characteristic map grid), selecting core or basic functions ("kernel functions"), optimizing the sensors, and/or collecting data, etc.

In some exemplary embodiments, one or more characteristic map(s) may be calculated (e.g. based on the least squares method) on the basis of a data processing process or a simulation (e.g., FE or FEM simulation or analysis).

In some exemplary embodiments, one or more characteristic maps may additionally or alternatively be calculated or determined based on a data processing process or a simulation on a virtual machine tool or on the basis of a digital twin of the machine tool and/or on the basis of experimental determinations on a machine tool in a test operation.

One or more calculated or determined characteristic map(s) may then be provided, e.g. by transferring the characteristic map(s) to the machine control.

For the adaptation of the characteristic map(s) by the neural network, the characteristic map(s) or entries in the characteristic map(s) may be transmitted from the machine control to the neural network as input data of the neural network and the characteristic map(s) or at least parts thereof may be read into the neural network. Moreover, new data or input variables may be read from the machine tool, from sensors of the machine tool and/or from the machine control of the machine tool. Preferably, the characteristic map(s) and/or at least one or more entries in the characteristic maps(s) are then updated or adapted on the basis of the network structure of the neural network.

In preferred exemplary embodiments, the network structure of the neural network is based on radial basis functions and/or on other interpolation functions (e.g., linear and non-linear regression methods).

Continuously learning compensation algorithms according to exemplary embodiments are preferably based on neural networks and/or interpolation functions (e.g. linear and/or non-linear regression methods, radial basis functions, polynomial basis functions, etc.). In addition, genetic algorithms may be integrated for the independent adaptation of the interpolation supporting points for the interpolation functions.

The neural network for adapting or optimizing the characteristic map(s) may include a learning algorithm, for example by data acquisition based on databases, measurement data and/or simulation data (for example by generating synthetic input variables based on simulations on a virtual machine tool or on the basis of a digital twin of the machine tool).

Exemplary embodiments of the present invention preferably relate to a method for continuously learning compensation algorithms based on a map-based error description of thermally induced displacements of the machine structure, in particular by means of a neural network.

A continuous extension of the compensation method particularly preferably relates to a load case description of the machine tool during machining and/or a position setting of the movable components or axes of the machine tool.

In preferred exemplary embodiments, processing methods may be recognized autonomously at the control and may be corrected using appropriate characteristic maps, e.g. by providing respectively corresponding characteristic maps for different processing methods and adapting or optimizing them by means of a neural network.

In addition, in further exemplary embodiments, the sensor placements may be adapted or optimized for improved feedback to the control. This also allows for a predictive state estimation via the improved sensor placement.

FIG. 1 shows a schematic exemplary diagram of a characteristic map KF for temperature compensation on a machine tool according to an exemplary embodiment of the present invention.

The characteristic map KF is provided by way of example in such a way that it incorporates as input variables a plurality of temperature measurement values Ti with i=1, . . . , n from n temperature sensors of the machine tool and a plurality of position measurement values Xj with j=1, . . . , m from position sensors of the machine tool. The position measurement values Xj preferably indicate positions (e.g., measured actual positions) of m movable components of the machine tool, e.g. of m movable axes of the machine tool. As an alternative or in addition to position measurement values, position target values or axis target values from the machine control may also be used.

As an output variable, the characteristic map KF outputs, for example, a correction parameter KP, which may be used at the machine control as a compensation value or as a correction value for adapting target positions, for correcting or compensating for thermally induced changes in position on the machine tool.

In further exemplary embodiments, the characteristic map may also merely define a plurality of temperature measurement values Ti with i=1, . . . , n from n temperature sensors of the machine tool as input variables (e.g., without position measurement values as input variables).

In addition, a plurality of correction parameters may be determined using one or more characteristic maps, and further input variables may also be defined.

Figure 2:
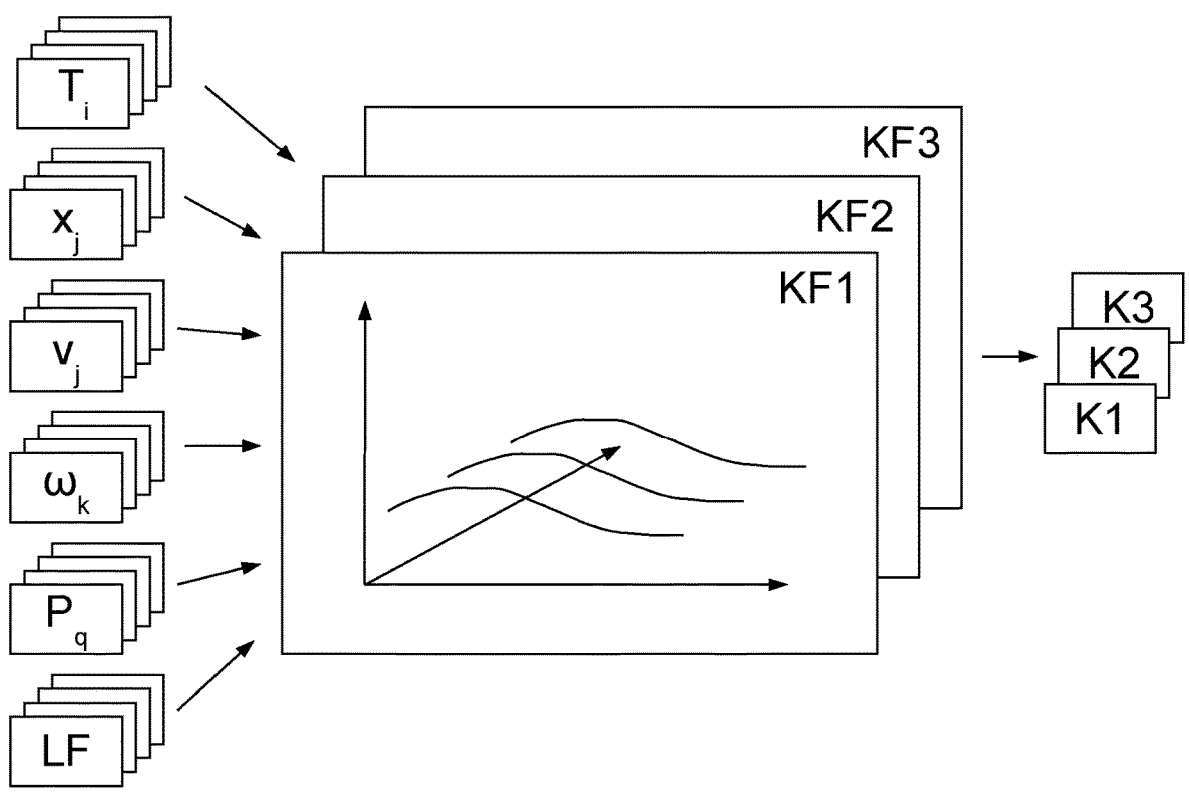
FIG. 2 shows a schematic exemplary diagram of a plurality of characteristic maps for temperature compensation on a machine tool according to an exemplary embodiment of the present invention.

FIG. 2 shows a schematic exemplary diagram of a plurality of characteristic maps KF1, KF2, KF3, . . . for temperature compensation on a machine tool according to an exemplary embodiment of the present invention.

The characteristic maps KF1, KF2, KF3, . . . are provided, by way of example, in such a way that a plurality of temperature measurement values Ti with i=1, . . . , n from n temperature sensors of the machine tool and a plurality of position measurement values Xj with j=1, . . . , m from position sensors of the machine tool are incorporated as input variables. The position measurement values Xj preferably indicate positions (e.g., measured actual positions) of m movable components of the machine tool, e.g. of m movable axes of the machine tool.

In addition or as an alternative, further sensor values and/or parameters of the machine control may be read as input variables, such as speed values Xj for speeds of movable components of the machine tool (e.g., the linear, rotary and/or pivot axes of the machine tool). The speed values Xj preferably indicate speeds (e.g., by means of time dependency of measured actual positions) of m movable components of the machine tool, e.g. of m movable axes of the machine tool. In addition or as an alternative, acceleration values or acceleration measurement values may also be incorporated as input variables.

In addition or as an alternative, further sensor values and/or parameters of the machine control may be read as input variables, such as rotational speed values $\omega k$ (e.g., spindle speed, motor or drive speed such as for axle drives, etc.), pressure values Pq (e.g., pressure measurement values such as air pressure, pressure value in pneumatic systems of the machine tool, pressure value in hydraulic systems of the machine tool, pressure value in cooling systems of the machine tool) and, for example, a humidity measurement value.

The characteristic maps KF1, KF2, KF3 each output, by way of example, a respective correction parameter KP1, KP2 or KP3 as output variables, which may be used at the machine control as a respective compensation value or as a respective correction value for adapting one or more target positions, for correction or compensation for thermally induced changes in position on the machine tool. Here, the respective correction parameters KP1, KP2 and KP3 may each specify correction parameters usable for individual axes of the machine tool or also specify correction parameters in individual orthogonal directions. The characteristic maps KF1, KF2, KF3 with one output variable each may also be understood or provided as a multidimensional characteristic map with a multidimensional output variable space, in which an output variable vector can be output.

Figure 3:
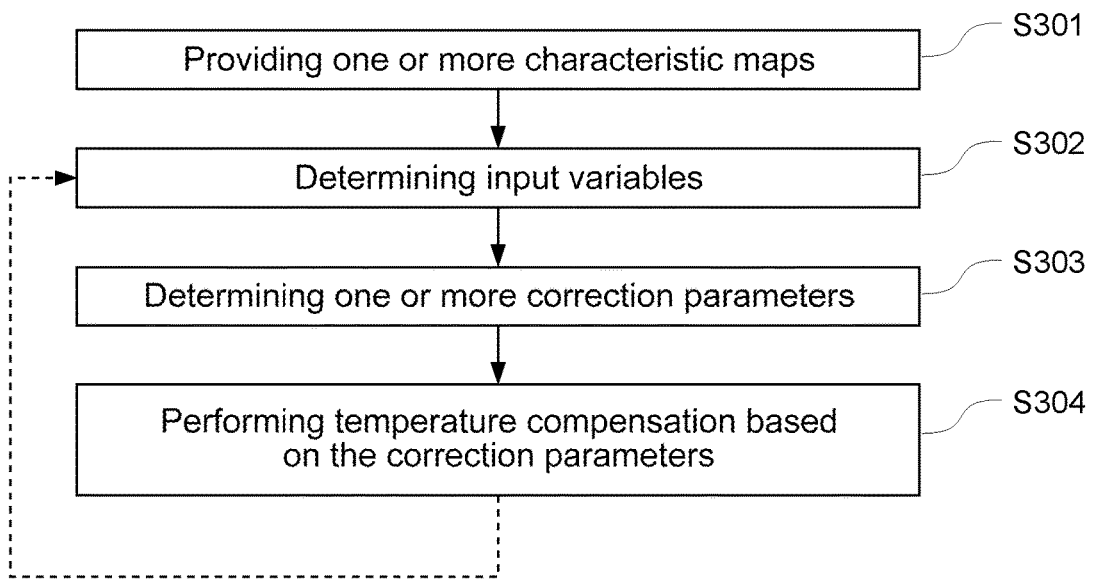
FIG. 3 shows a schematic diagram of a map-based method for temperature compensation on a machine tool.

FIG. 3 shows a schematic diagram of a map-based method for temperature compensation on a machine tool.

In step S301, for example, one or more characteristic maps indicating or describing a temperature behavior of the machine tool are provided on the machine control of the machine tool. The characteristic map(s) may have been generated in an FE-model-based simulation or analysis and are preferably provided on the machine control as a stored data structure (e.g., as a lookup table or lookup matrix).

In step S302, input data or input variables are determined on the machine tool by way of example. This preferably comprises reading temperature measurement values from temperature sensors of the machine tool. In addition, this may comprise reading position data relating to the actual positions of movable components (e.g., movable axes) of the machine tool, e.g. from the machine control or from position measuring sensors of the machine tool. Furthermore, additional sensor data or control data may be read (see above).

In step S303, one or more correction parameters or compensation parameters are determined, for example, on the basis of the input data or input variables and on the basis of the provided characteristic map(s), e.g. as direct output variable(s) of the characteristic map(s) and/or from further calculations based on the output variable(s) of the characteristic map(s).

In step S304, for example, a temperature compensation or correction for a thermal change in position on the machine tool is carried out at the machine control based on the determined one or more correction parameters or compensation parameters.

Steps S302 to S304 may preferably be repeated for repeated temperature compensation, e.g. periodically, quasi continuously (e.g., discretely at a clock frequency dependent on the clock frequency of the machine control), regularly, at predetermined times, when temperature changes are detected, etc.

Figure 4:
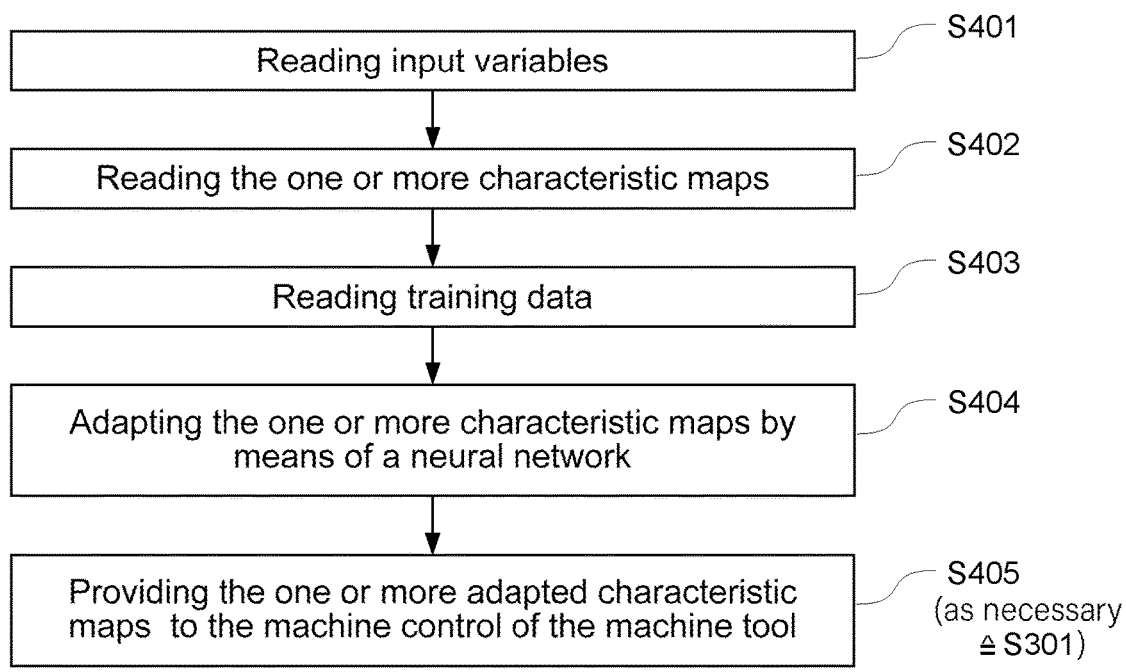
FIG. 4 shows a schematic diagram of an application of a neural network for updating characteristic maps for a map-based method for temperature compensation on a machine tool.

FIG. 4 shows a schematic diagram of an application of a neural network for updating characteristic maps for a map-based method for temperature compensation on a machine tool.

In step S401, input variables of the characteristic map are read, by way of example (e.g. from the machine control or via direct transmission of sensor values from sensors of the machine tool). Preferably, some or all of the input variables of the characteristic map to be updated are read. It is also possible to read further input variables. Alternatively or additionally, sensor data may also be generated from a computer-implemented simulation of a machine tool (e.g., on a virtual machine tool or on the basis of a digital twin of the machine tool), i.e. so-called synthetically generated sensor data.

In step S402, by way of example, the characteristic map(s) or at least entries of the characteristic maps are read. For this purpose, the characteristic maps currently provided or stored on the machine control, or at least parts thereof, are read out.

In step S403, additional training data are optionally read, by way of example. Such training data for training the neural network may include, for example, actually measured position data, e.g. when the temperature compensation is performed in a training step on a machine tool with a position measuring device additionally clamped instead of a tool (e.g., by means of a measuring probe) and/or with additional position measuring devices (e.g., with laser measurement, camera measurement, etc.) in order to compare the actual and target positions with additional position measurement values at the machine control.

Alternatively or additionally, training data may also be generated from a computer-implemented simulation of a machine tool (e.g., on a virtual machine tool or on the basis of a digital twin of the machine tool) or may be retrieved from a database that collects historical processing data from a plurality of machine tools.

In addition, the training data may also include data read from the control data.

In step S404, the neural network (e.g., after or during a training operation), that is, for example, a training or already trained neural network, is used to at least partially adapt or update the characteristic map(s) that have been read based on the input data and/or the characteristic map(s) provided as well as possibly based on optionally available training data.

In step S405, the adapted or updated characteristic map(s) or the adapted or updated entries are provided to the machine control. Thus, for a temperature compensation according to FIG. 3, an adapted or updated characteristic map or a plurality of adapted or updated characteristic maps may be provided at the machine control (e.g., as step S301 in FIG. 3 or also during the repetition of steps S302 to S304 in FIG. 3).

Figure 5:
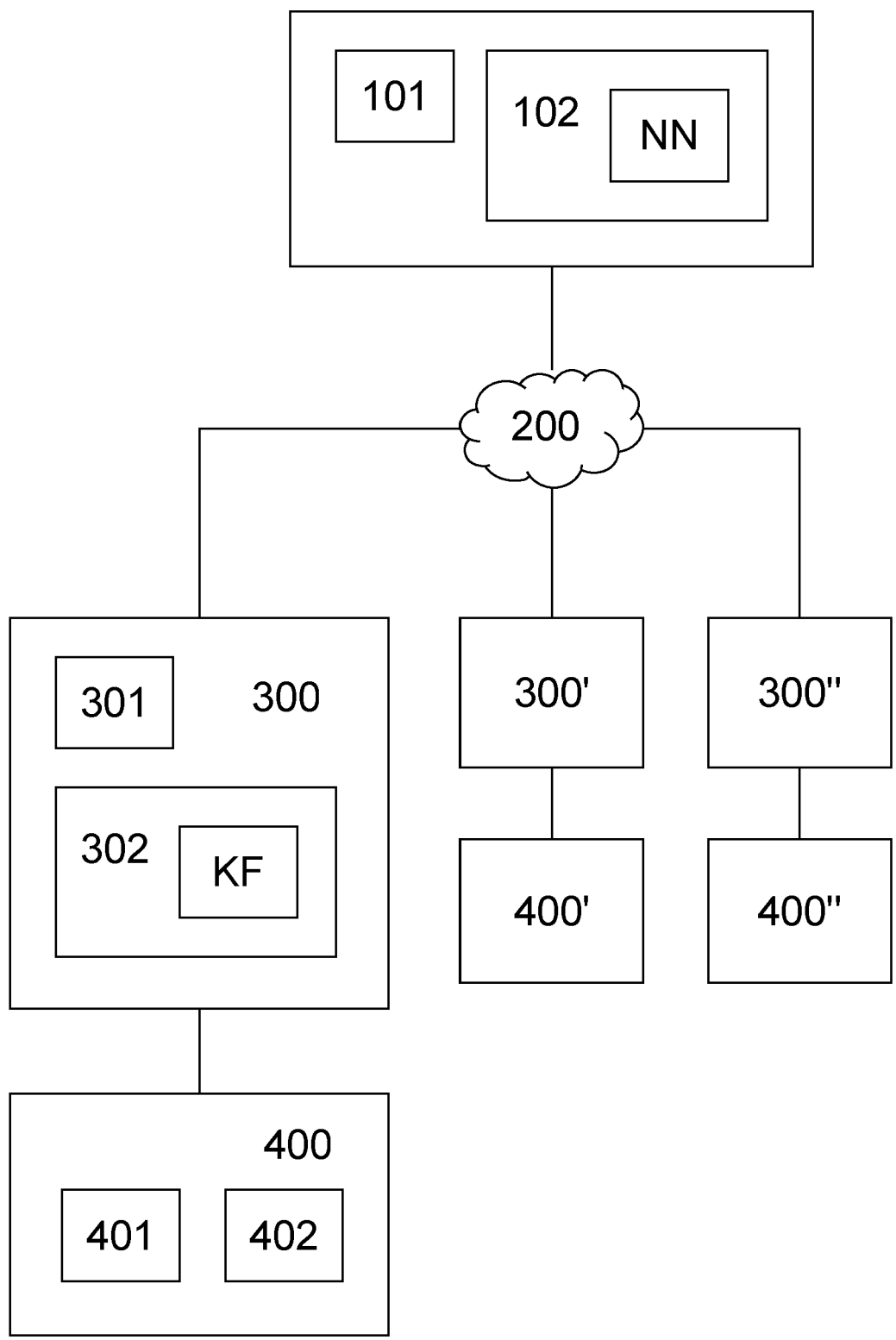
FIG. 5 shows, by way of example, a schematic diagram of a system for adapting one or more characteristic maps on one or more machine tools according to an exemplary embodiment of the invention.

FIG. 5 schematically shows, by way of example, a system for adapting one or more characteristics maps on one or more machine tools according to an exemplary embodiment of the invention.

The system comprises, for example, a server 100 having a processor 101 and a storage device 102 on which a neural network NN executable by means of the processor 101 is implemented or stored.

The server 100 is, by way of example, connected to a control device 300 of a machine tool 400 via a communication network 200 (e.g., a LAN, WLAN, or even the Internet). The machine tool 400 preferably includes, by way of example, actuators 401 (e.g., spindle drive, axle drives, etc.) and sensors 402 (e.g., temperature sensors, position measuring sensors, pressure sensors, humidity sensors, acceleration sensors, vibration sensors, and/or force sensors, etc.).

The control device 300 comprises, for example, a processor 301 and a storage device 302 on which one or more characteristic maps KF are provided or stored. The processor 301 is preferably configured to carry out temperature compensation on the basis of the characteristic map(s) KF (e.g. in accordance with one or more of the aspects and examples described above).

For example, the processor 101 of the server 100 is configured to use the neural network NN to adapt or update the characteristics map(s) KF at the control device 300 (e.g., in accordance with one or more of the aspects and examples described above).

Furthermore, further control devices 300' and 300" with corresponding machine tools 400' and 400" are connected to the server 100, so that the neural network NN may be used, for example, to adapt or update the characteristic maps on a plurality of machine tools (e.g., of the same design at different installation locations).

Examples or exemplary embodiments of the present invention and their advantages have been described in detail above with reference to the accompanying figures. It is to be noted again that the present invention, however, is in no way limited or restricted to the exemplary embodiments described above and their implementation features, but rather further comprises modifications of the exemplary embodiments, in particular those that are included within the scope of protection of the independent claims via modifications of the features of the examples described or via combinations of individual ones or a plurality of the features of the examples described.

The invention claimed is:

1. A method for compensating for a thermally induced change in position on a numerically controlled machine tool, comprising:
    providing a characteristic map at a control device of said machine tool that describes a thermo-elastic behavior of said machine tool and is based on one or more FE models of said machine tool, determining one or more temperature values by means of one or more temperature sensors on said machine tool, determining one or more compensation parameters at said control device of said machine tool based on the determined one or more temperature values and the provided characteristic map, and compensating for a temperature-dependent change in position on said machine tool according to the determined one or more compensation parameters, and adapting the provided characteristic map by means of a computer-implemented neural network.

2. The method according to claim 1, characterized in that input data for said neural network are determined in real time during operation of said machine tool, in particular during a work process of said machine tool.

3. The method according to claim 1, characterized in that input data for said neural network include sensor data from sensors of said machine tool and/or input data calculated from sensor data from sensors of said machine tool.

4. The method according to claim 1, characterized in that output data of said neural network adapt or update the characteristic map and/or output data of said neural network specify an adapted or updated characteristic map.

5. The method according to claim 1, characterized in that adapting the characteristic map comprises:

reading at least part of the characteristic map currently provided at said control device into said neural network, reading input data, in particular including sensor data from sensors of said machine tool, into said neural network, determining a network structure of at least a part of an adapted or updated characteristic map on said neural network; and/or adapting the characteristic map comprises:

changing one or more coefficients of the characteristic map based on said neural network.

6. The method according to claim 5, characterized in that the characteristic map provided at said control device is adapted or updated on the basis of the determined network structure.

7. The method according to claim 1, characterized in that adapting the provided characteristic map is carried out repeatedly by means of said computer-implemented neural network, in particular at regular intervals.

8. The method according to claim 1, characterized in that said neural network controls the characteristic map provided at said control device of said machine tool.

9. The method according to claim 1, characterized in that sensor values of said one or more temperature sensors of said machine tool are transmitted to said neural network as input data of said neural network for adapting the provided characteristic map.

10. The method according to claim 1, characterized in that sensor values of one or more position sensors of said machine tool are transmitted to said neural network as input data of said neural network for adapting the provided characteristic map.

11. The method according to claim 10, characterized in that said one or more position sensors of said machine tool output sensed actual values of linear and/or rotary axes of said machine tool.

12. The method according to claim 1, characterized in that target values of linear and/or rotary axes of said machine tool are transmitted from said control device to said neural network as input data of said neural network for adapting the provided characteristic map.

13. The method according to claim 1, characterized in that position measurement values of a position measurement method carried out on said machine tool are transmitted to said neural network as input and/or output data of said neural network for adapting the provided characteristic map.

14. The method according to claim 13, characterized in that said position measurement method is carried out on said machine tool by means of one or more measuring probes, said position measurement method is carried out on said machine tool by means of one or more electromagnetic measuring devices, and/or said position measurement method on said machine tool is carried out by means of one or more optical measuring devices, in particular by means of a laser measuring device and/or a camera device.

15. The method according to claim 1, characterized in that said neural network is integrated into said control device of said machine tool.

16. The method according to claim 1, characterized in that said neural network is integrated into a control computer connected to said control device of said machine tool.

17. The method according to claim 1, characterized in that said neural network is integrated into a central server connected to said control device of said machine tool.

18. The method according to claim 17, characterized in that said central server is connected to a plurality of control devices of machine tools.

19. The method according to claim 1, characterized by determining a displacement map on the basis of updates of the characteristic map.

20. The method according to claim 18, characterized in that said central server has a plurality of neural networks, wherein each neural network is associated with one of the machine tools and the plurality of neural networks communicate with one another.

21. A method for compensating for a thermally induced change in position on a numerically controlled machine tool, comprising:

providing a characteristic map describing a temperature behavior, in particular a thermo-elastic behavior, of said machine tool at a control device of said machine tool, determining one or more temperature values by means of one or more temperature sensors on said machine tool, determining one or more compensation parameters at said control device of said machine tool based on the determined one or more temperature values and the provided characteristic map, compensating for a temperature-dependent change in position on said machine tool according to the determined one or more compensation parameters, and adapting the provided characteristic map by means of a computer-implemented neural network, wherein said neural network is integrated into a central server connected to said control device of said machine tool, wherein said central server is connected to a plurality of control devices of machine tools, and wherein said central server has a plurality of neural networks, wherein each neural network is associated with one of the control devices of the machine tools and the plurality of neural networks communicate with one another.

22. A control system for compensating for a thermally induced change in position on a numerically controlled machine tool, comprising:

a control device of said machine tool, and a computer-implemented neural network, wherein a characteristic map, describing a temperature behavior of said machine tool based on one or more FE models of said machine tool, is provided at said control device of said machine tool, wherein said control device of said machine tool is configured to determine one or more compensation parameters on the basis of one or more temperature values determined by means of one or more temperature sensors on said machine tool and the provided characteristic map and to compensate for a temperature-dependent change in position of said machine tool according to the one or more determined compensation parameters, and wherein said computer-implemented neural network is configured to adapt the provided characteristic map.

23. A control system for compensating for a thermally induced change in position on a numerically controlled machine tool, comprising:

a control device of said machine tool, a computer-implemented neural network, and a central server connected to said control device of said machine tool, wherein a characteristic map describing a temperature behavior, in particular thermo-elastic behavior, of said machine tool is provided at said control device of said machine tool, wherein said control device of said machine tool is configured to determine one or more compensation parameters on the basis of one or more temperature values determined by means of one or more temperature sensors on said machine tool and the provided characteristic map and to compensate for a temperature-dependent change in position of said machine tool according to the one or more determined compensation parameters, and wherein said computer-implemented neural network is configured to adapt the provided characteristic map, wherein said neural network is integrated into the central server connected to said control device of said machine tool, wherein said central server is connected to a plurality of control devices of machine tools, wherein said central server has a plurality of neural networks, and wherein each neural network is associated with one of the control devices of the machine tools and the plurality of neural networks communicate with one another.

* * * * *